A. P. LOHMANN.
MIXING MACHINE.
APPLICATION FILED AUG. 19, 1921.
1,412,532.
Patented Apr. 11, 1922.
2 SHEETS—SHEET 2.
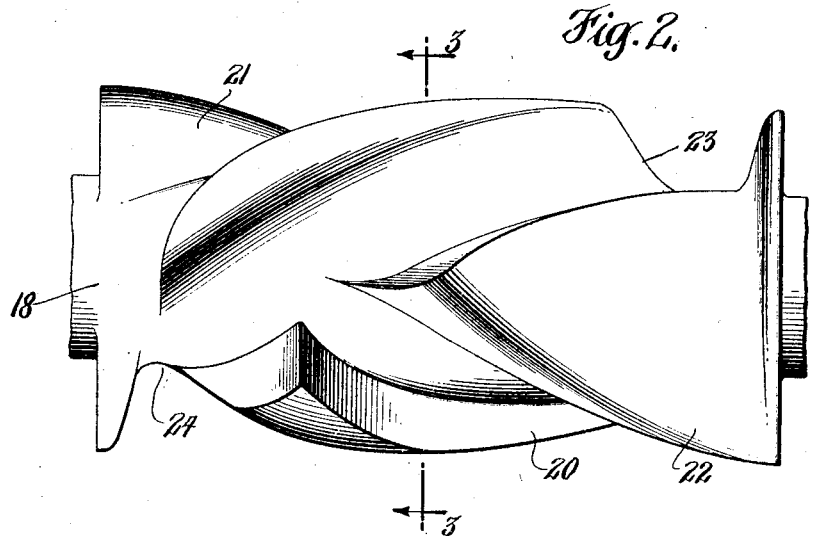
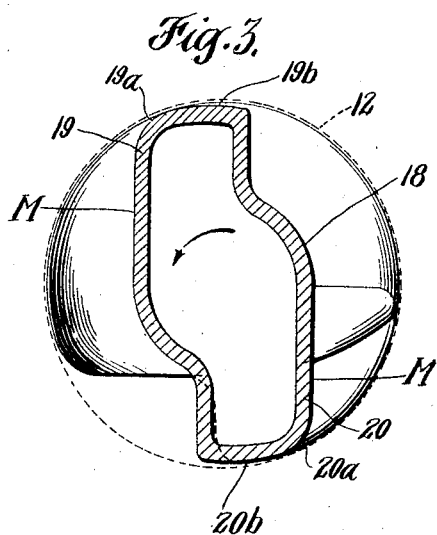
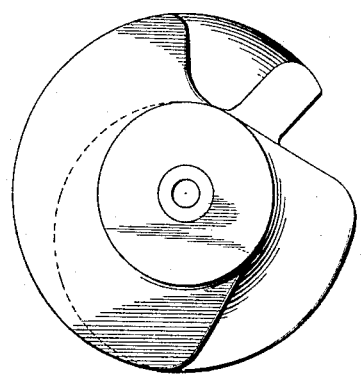
Inventor
Alfred P. Lohmann
By his Attorney
Merrell E. Clark

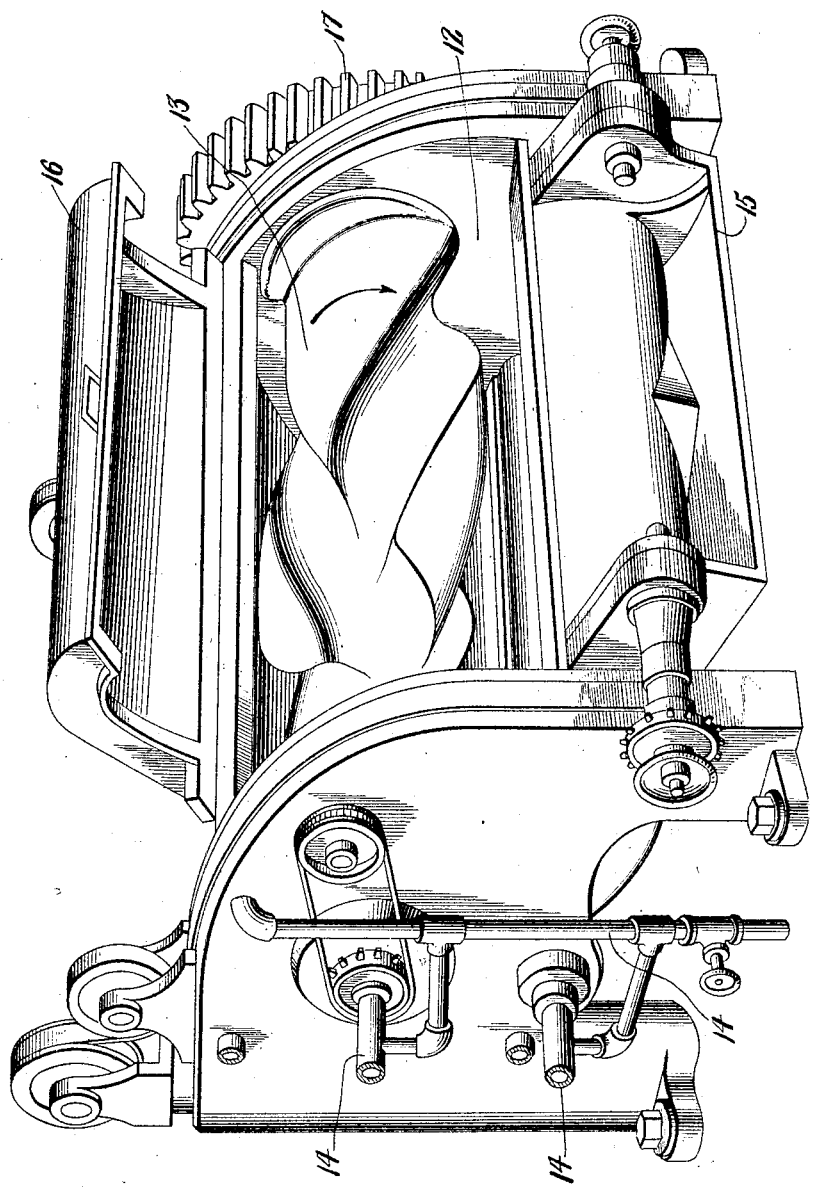

UNITED STATES PATENT OFFICE.

ALFRED P. LOHMANN, OF AKRON, OHIO.

MIXING MACHINE.

1,412,532.  Specification of Letters Patent.  Patented Apr. 11, 1922.

Application filed August 19, 1921. Serial No. 493,521.

*To all whom it may concern:*

Be it known that I, ALFRED P. LOHMANN, a citizen of the United States, and a resident of Akron, county of Summit, State of Ohio, have invented new and useful Improvements in Mixing Machines, of which the following is a description.

This invention relates to machines for mixing materials, such, for example, as rubber, gums, pigments, etc., and has for its general object the provision of an improved rotor or mixing member for use in mixing machines of the general type described in my copending application, Serial No. 317,871, filed August 16, 1919.

It has been found in practice that one of the most difficult problems in the operation of mixing machines of this character is the problem of temperature regulation—of varying and maintaining the temperature at the desired point or points during the mixing operation. As the mixing progresses, the mixing action itself, and the friction caused thereby due to the relative movement of the material and the machine parts and to the relative moment constantly occurring within the material itself, tend constantly to increase the temperature of the mass. To keep this temperature within the desired limits, cooling means have been provided, such, for example, as water within the water jackets with which both the rotor and the mixing chambers of the machine of my aforesaid application are provided.

One of the primary objects of my present invention is to provide a rotor of such a design that the temperature of the mass may be controlled more efficiently than has been possible heretofore.

Another object of my invention is to provide a rotor which will positively convey the material to be mixed in such a path and in such a manner that the mixing may be accomplished most thoroughly and most efficiently.

With these and other objects in view, as will appear hereinafter, my invention comprises the parts and combination of parts which I shall now describe and which are more particularly defined in the appended claims.

In the accompanying drawings which illustrate one embodiment of my present invention, Fig. 1 is a perspective view of a mixing machine provided with my improved rotor, Fig. 2 is a front elevation of the rotor, Fig. 3 is a cross sectional view thereof taken on the line 3—3 of Fig. 2, and Fig. 4 is an end view of the rotor.

The mixing machine illustrated in Fig. 1 is, with the exception of the rotor, the same as that illustrated and described in my aforesaid pending application. This machine, as appears more fully from my aforesaid application, includes a mixing chamber 12 and a rotor 13 located within the mixing chamber. Both the rotor and the walls of the mixing chamber are preferably hollow for the circulation of a heat conducting medium, such, for example, as water, which is conducted thereto by means of the system of piping indicated at 14. This heat conducting fluid may be used to heat up the machine when required, and may also be used to cool it.

In the operation of the machine the material to be mixed is placed within the mixing chamber 12 and the two doors 15, 16 are then closed. The door 15 may contain a feeding device for certain additional materials, as described in my aforesaid application, if desired. After the doors have been closed power is applied to the rotor through any suitable gearing or other power transmitting mechanism, as indicated, for example, at 17, and the configuration of the rotor is such that the material being mixed is positively forced successively and continuously from one end of the mixing chamber to the other. At the same time that it is forced longitudinally of the mixing chamber it also is smeared between the outer surface of the rotor and the wall of the mixing chamber, which smearing action produces an intimate intermingling of the components of the material.

The above is a general description of the operation of my machine. My present invention relates not to the machine as a whole, but primarily to an improved rotor for such a machine.

This rotor is best shown in Figs. 2, 3 and 4 of the drawings. It comprises a body portion 18 to which are secured, either integrally or otherwise, two oppositely arranged helical flanges 19, 20, and two intermediate flanges 21, 22. The flanges 19, 20, extend substantially from end to end of the rotor and form with the intermediate flanges 21, 22 defined helical passages such as 23, 24, which extend from end to end of the rotor. As a result of the formation of these defined passages the rotation of the rotor and its flanges 19, 20 within the mixing chamber positively forces the material being mixed from end to end of the chamber through these passages.

In addition to its conveying face M, each of the flanges above described is provided with a smearing face or surface, such as indicated at 19ª, 20ª in Fig. 3. The function of this smearing surface is to produce, in conjunction with the adjacent cylindrical wall of the chamber, a smearing action upon the material which is being mixed, thereby effecting a more intimate mixture than is possible by any other means of which I am aware. The rotors illustrated in my aforesaid pending application include smearing surfaces for the purposes above described. However, I have found in practice that because the smearing surfaces therein illustrated are of relatively narrow breadth, the contact between these surfaces and the material over which they pass is of such short duration that it is difficult to make use of the radiation of these surfaces in controlling the temperature of the material being mixed. In other words, the time during which any particular portion of the material is in contact with one of the smearing surfaces illustrated in my aforesaid application is almost negligible, and during that entire brief period of time that material is being subjected to extremely heavy pressure and friction which, of course, tends appreciably to elevate its temperature.

To obviate the difficulty in heat regulation which I have outlined above, I have provided each of the flanges 19, 20, 21 and 22, with a tempering surface as 19ᵇ, 20ᵇ, contiguous to its smearing surface and extending therefrom in a direction opposite to the direction of rotation of the rotor. This tempering surface is preferably of material width and is spaced from the inner surface of the cylinder wall sufficiently so that the material being mixed may be caused to traverse the tempering surface, not by a vigorous smearing action such as is produced by the smearing surface, but by being pushed or crowded thereover by the new material, which is constantly being acted upon by the smearing surface. As a result, the material, during its relatively extended passage over the tempering surface, is not being worked or subjected to heavy friction, but is being subjected only to light sliding friction. Accordingly, the temperature of the material is very largely influenced by the temperature of the tempering surfaces themselves. And since the temperature of the tempering surfaces may readily be controlled by regulating the circulating medium within the water jacket, it is obvious that I have provided efficient means whereby the operator may at all times control the temperature of the material being mixed.

The tempering surfaces which I employ may be of any desired configuration. For example, they may be parallel to the chamber wall, i. e., spaced therefrom an equal distance at all points, or they may be irregular or non-parallel. As shown in Fig. 3 they are of this latter character, receding gradually from the chamber wall in a direction opposite to the direction of rotation of the rotor. The essential characteristics of these surfaces are that they be wide enough and spaced sufficiently from the chamber wall so that they may accomplish the results above described.

My new rotor provides not only a more thorough mixing of the material upon which the machine is being operated, but it also enables the operator more readily to regulate the temperature of the machine and its contents at all times.

Of course, I do not wish to limit myself to the particular type of rotor which I have shown herein, since my invention contemplates broadly the provision of flanges or other means for positively forcing the material from end to end of a mixing chamber through defined helical passages, and the provision upon such flanges of relatively broad tempering surfaces which operate in the manner above described.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a machine for mixing materials, the combination of a mixing chamber and a rotor located therein, said rotor being provided with two oppositely disposed helical flanges each extending substantially from end to end of the rotor, and two intermediate flanges which together with said first mentioned flanges form defined oppositely disposed helical passages extending from end to end of the rotor, whereby said rotor is adapted positively to force the materials to be mixed continuously and successively from end to end of the chamber.

2. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a relatively broad tempering surface spaced from the chamber wall.

3. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a relatively broad tempering surface which recedes from the chamber wall in the direction opposite to the direction of rotation of the rotor.

4. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a relatively broad tempering surface which recedes gradually from the chamber wall in the direction opposite to the direction of rotation of the rotor.

5. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a smearing surface adjacent the chamber wall and with a tempering surface spaced from the chamber wall.

6. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a smearing surface adjacent the chamber wall and with a tempering surface contiguous to the smearing surface and receding from the chamber wall in a direction opposite to the direction of rotation of the rotor.

7. In a machine for mixing materials, the combination of a mixing chamber and a rotor located therein and adapted positively to force the materials to be mixed continuously and successively from end to end of the chamber, said rotor being provided with oppositely disposed helical flanges each of which extends radially, substantially to the wall of the mixing chamber, the face of each flange being provided with a smearing surface adjacent the chamber wall and with a tempering surface contiguous to the smearing surface and receding gradually from the chamber wall in a direction opposite to the direction of rotation of the rotor.

ALFRED P. LOHMANN.